(12) United States Patent
Takamura et al.

(10) Patent No.: US 9,088,811 B2
(45) Date of Patent: Jul. 21, 2015

(54) INFORMATION PROVIDING SYSTEM, INFORMATION PROVIDING METHOD, INFORMATION PROVIDING DEVICE, PROGRAM, AND INFORMATION STORAGE MEDIUM

(75) Inventors: Seiichi Takamura, Tokyo (JP); Hideaki Watanabe, Tokyo (JP); Hirotoshi Maegawa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 148 days.

(21) Appl. No.: 13/701,083

(22) PCT Filed: Feb. 7, 2011

(86) PCT No.: PCT/JP2011/052482
§ 371 (c)(1),
(2), (4) Date: Nov. 30, 2012

(87) PCT Pub. No.: WO2011/155231
PCT Pub. Date: Dec. 15, 2011

(65) Prior Publication Data
US 2013/0073618 A1    Mar. 21, 2013

(30) Foreign Application Priority Data
Jun. 8, 2010   (JP) ................................. 2010-130988

(51) Int. Cl.
*G06F 15/16*   (2006.01)
*H04N 21/258*  (2011.01)
(Continued)

(52) U.S. Cl.
CPC ............ *H04N 21/258* (2013.01); *G06Q 30/02* (2013.01); *H04N 21/252* (2013.01);
(Continued)

(58) Field of Classification Search
CPC .. H04L 67/306; H04N 21/258; H04N 21/252; H04N 21/4667
USPC ................................................... 709/203, 228
See application file for complete search history.

(56) References Cited

U.S. PATENT DOCUMENTS

2004/0210661 A1* 10/2004 Thompson ..................... 709/228
2006/0253491 A1* 11/2006 Gokturk et al. ............ 707/104.1
(Continued)

FOREIGN PATENT DOCUMENTS

| CN | 101329683 A | 12/2008 |
|---|---|---|
| CN | 101685458 A | 3/2010 |

(Continued)

OTHER PUBLICATIONS

International Search Report for corresponding application PCT/JP2011/052482, dated Mar. 8, 2011.
(Continued)

*Primary Examiner* — Yves Dalencourt
(74) *Attorney, Agent, or Firm* — Matthew B. Dernier, Esq.

(57) ABSTRACT

An information providing system for accurately providing a user with information that matches the user at a small calculating cost. The system includes a feature vector generating unit for generating a feature vector of each of a plurality of persons, and a user cluster generating unit for classifying the plurality of persons into a plurality of clusters based on the feature vector of each of the plurality of persons. The system selects at least one of the plurality of clusters based on a feature vector of a specified person, and outputs information related to the selected cluster.

11 Claims, 7 Drawing Sheets

(51) Int. Cl.
*G06Q 30/02* (2012.01)
*H04N 21/2668* (2011.01)
*H04N 21/25* (2011.01)
*H04N 21/442* (2011.01)
*H04N 21/466* (2011.01)
*H04N 21/478* (2011.01)
*H04N 21/84* (2011.01)

(52) U.S. Cl.
CPC .... *H04N 21/2668* (2013.01); *H04N 21/44222* (2013.01); *H04N 21/4667* (2013.01); *H04N 21/4781* (2013.01); *H04N 21/84* (2013.01)

(56) References Cited

U.S. PATENT DOCUMENTS

| | | | |
|---|---|---|---|
| 2006/0253493 A1* | 11/2006 | Tamas et al. | 707/104.1 |
| 2007/0206834 A1* | 9/2007 | Shinkai et al. | 382/103 |
| 2011/0184977 A1 | 7/2011 | Du | |
| 2013/0121584 A1* | 5/2013 | Bourdev et al. | 382/190 |

FOREIGN PATENT DOCUMENTS

| | | |
|---|---|---|
| JP | 11015848 A | 1/1999 |
| JP | 2002230024 A | 8/2002 |
| JP | 2003303209 A | 10/2003 |
| JP | 2009193465 A | 8/2009 |
| WO | 03017137 A1 | 2/2003 |

OTHER PUBLICATIONS

International Preliminary Report on Patentability and Written Opinion for corresponding application PCT/JP2011/052482, dated Mar. 8, 2011.

Eiji Tanaka, "John Tansaku Shien System no Kochiku (2)", IEICE Technical Report, 15, vol. 96, No. 578 pp. 81-86 Mar. 1997.

Office Action for corresponding Japanese Patent Application No. 2010-130988, dated Mar. 8, 2011: (The relevance of the Japanese language Office Action may be found in the text of the IPRP for PCT/JP2011/052482, dated Mar. 8, 2011, provided herein.).

Office Action for corresponding Chinese application 201180028498. 7, dated Jan. 19, 2015.

Shan Huo, Personalized Recommendation Algorithm Based on User Behavior Cluster, Silicon Valley 22nd Issue, 2 pages, Nov. 30, 2009. (for relevance see CN-OA for Chinese application 201180028498.7, dated Jan. 19, 2015).

* cited by examiner

FIG.6

| USER ID | GAME TITLE |
|---|---|
| aaa | XXXX, YYYY, ...... |
| bbb | YYYY, ZZZZ, ...... |
| ccc | QQQQ, PPPP, AAAA, ...... |
| dddd | XXXX, QQQQ, ...... |

FIG.7

| GAME TITLE | GENRE |
|---|---|
| XXXX | RPG |
| YYYY | ACTION |
| ZZZZ | SPORTS |
| PPPP | RACE |
| QQQQ | PUZZLE |

FIG.8

| USER ID | ACTION | SPORTS | PUZZLE | RPG | .... | RACE |
|---|---|---|---|---|---|---|
| aaa | 18 | 0 | 0 | 5 | | 43 |
| bbb | 21 | 24 | 0 | 0 | | 12 |
| ccc | 0 | 0 | 28 | 13 | | 0 |
| ddd | 0 | 0 | 12 | 43 | | 3 |

FIG.9

| CLUSTER ID | REPRESENTATIVE FEATURE VECTOR | BELONGING USER ID |
|---|---|---|
| 001 | (12, 0, 0, 1, ···53) | aaa, eee, ··· |
| 002 | (0, 0, 18, 10, ···0) | ccc, ddd, fff, ··· |
| 003 | (18, 26, 0, 0, ···8) | bbb, ggg, ··· |

FIG.10

| CLUSTER ID | GAME SOFTWARE ID/GAME TITLE |
|---|---|
| 0001 | G0001/"ABCD" |
| 0002 | G0003/"PQRS" |

FIG.11

| PLAY DATE/TIME | GAME TITLE | GENRE |
|---|---|---|
| 2/1/2010 | ZZZZ | SPORTS |
| 2/2/2010 | ZZZZ | SPORTS |
| 2/3/2010 | XXXX | RPG |
| 2/4/2010 | XXXX | RPG |
| 2/5/2010 | XXXX | RPG |
| 2/5/2010 | QQQQ | PUZZLE |
| 2/6/2010 | XXXX | RPG |

INFORMATION PROVIDING SYSTEM, INFORMATION PROVIDING METHOD, INFORMATION PROVIDING DEVICE, PROGRAM, AND INFORMATION STORAGE MEDIUM

TECHNICAL FIELD

The present invention relates to an information providing system, an information providing method, an information providing device, a program, and an information storage medium, and in particular, to output of information according to feature data of a user.

BACKGROUND ART

Various kinds of information is provided through an information communications network, such as the Internet, and various recommender systems have been developed in order to provide information that matches an user. For example, in a collaborative filtering system, each user is provided with information related to a similar user, for example, information on products purchased by the similar user. Similarities between users are calculated on the basis of a distance between feature data (e.g., feature vector) of each user.

SUMMARY OF INVENTION

In order to implement the above mentioned collaborative filtering, it is required to collect feature data and related information on, for example, purchased products from as many users as possible so as to accurately identify information that matches the user. However, an increased number of users is associated with an increased cost of calculating the similar users, i.e., a cost of computational resources and time.

One or more embodiments of the present invention have been conceived in view of the above, and an object thereof is to provide an information providing system, an information providing method, an information providing device, an information providing program, and an information storage medium for accurately providing a user with information that matches the user at a small calculating cost.

In order to solve the above described problems, an information providing system according to an embodiment of the invention includes a first feature data obtaining unit configured to obtain a feature data item of each of a plurality of persons, a classifying unit configured to classify the plurality of persons into a plurality of clusters based on the feature data item of each of the plurality of persons, a second feature data obtaining unit configured to obtain a feature data item of a specified person, a cluster selecting unit configured to select at least one of the plurality of clusters based on the feature data item obtained by the second feature data obtaining unit, and an information output unit configured to output information related to the selected cluster.

In an aspect of the present invention, the information output unit outputs information related to at least one of the plurality of persons classified into the selected cluster.

In an aspect of the present invention, the information providing system further includes an information storing unit configured to store given information in association with at least one of the clusters. The information output unit outputs the given information stored in the information storing unit in association with the selected cluster.

In an aspect of the present invention, the first feature data obtaining unit includes an information receiving unit configured to receive information related to each of the plurality of persons through a communications network, and a feature data generating unit configured to generate the feature data item of each of the plurality of persons based on the received information.

In an aspect of the present invention, the information providing system includes a sever computer and a client computer. The server computer includes a representative feature data sending unit configured to send a representative feature data item, which represents each of the plurality of clusters, to the client computer, and the client computer includes a representative feature data receiving unit configured to receive the representative feature data item. The cluster selecting unit is included in the client computer and selects at least one of the plurality of clusters based on the representative feature data item received by the representative feature data receiving unit.

In an aspect of the present invention, the first feature data obtaining unit repeatedly obtains the feature data item of each of the plurality of persons, and the classifying unit classifies the plurality of persons into the plurality of clusters each time the feature data item of each of the plurality of persons is obtained.

An information providing method according to an embodiment of the present invention includes the steps of obtaining a feature data item of each of a plurality of persons, classifying the plurality of persons into a plurality of clusters based on the feature data item of each of the plurality of persons, obtaining a feature data item of a specified person, selecting at least one of the plurality of clusters based on the obtained feature data item of the specified person, and outputting information related to the selected cluster.

An information providing device according to an embodiment of the present invention includes a first feature data obtaining unit configured to obtain a feature data item of each of a plurality of persons, a classifying unit configured to classify the plurality of persons into a plurality of clusters based on the feature data item of each of the plurality of persons, a representative feature data sending unit configured to send a representative feature data item, which represents each of the plurality of clusters, to other computers, a cluster specifying data receiving unit configured to receive cluster specifying data, which specifies one of the plurality of clusters, from the other computers, and an information sending unit configured to send information related to the cluster specified by the cluster specifying data to the other computers.

A program according to an embodiment of the present invention causes a computer to execute a first feature data obtaining unit configured to obtain a feature data item of each of a plurality of persons, a classifying unit configured to classify the plurality of persons into a plurality of clusters based on the feature data item of each of the plurality of persons, a representative feature data sending unit configured to send a representative feature data item, which represents each of the plurality of clusters, to other computers, a cluster specifying data receiving unit configured to receive cluster specifying data, which specifies one of the plurality of clusters, from the other computers, and an information sending unit configured to send information related to the cluster specified by the cluster specifying data to the other computers. The computer may be a personal computer, a server computer, or various computer game systems. The program may be stored in a computer readable information storage medium such as a CD-ROM or a DVD-ROM.

BRIEF DESCRIPTION OF DRAWINGS

In the accompanying drawings:

FIG. 6 is a diagram schematically illustrating content stored in a user data storing unit;

FIG. 7 is a diagram schematically illustrating content stored in a content metadata storing unit;

FIG. 8 is a diagram schematically illustrating content stored in a feature vector storing unit of the information providing device;

FIG. 9 is a diagram schematically illustrating content stored in a user cluster storing unit;

FIG. 10 is a diagram schematically illustrating content stored in a new release software information storing unit; and FIG. 11 is a diagram schematically illustrating content stored in a user log storing unit.

DESCRIPTION OF EMBODIMENTS

An embodiment of the present invention will be described below in detail with reference to the accompanying drawings.

Figure 1:
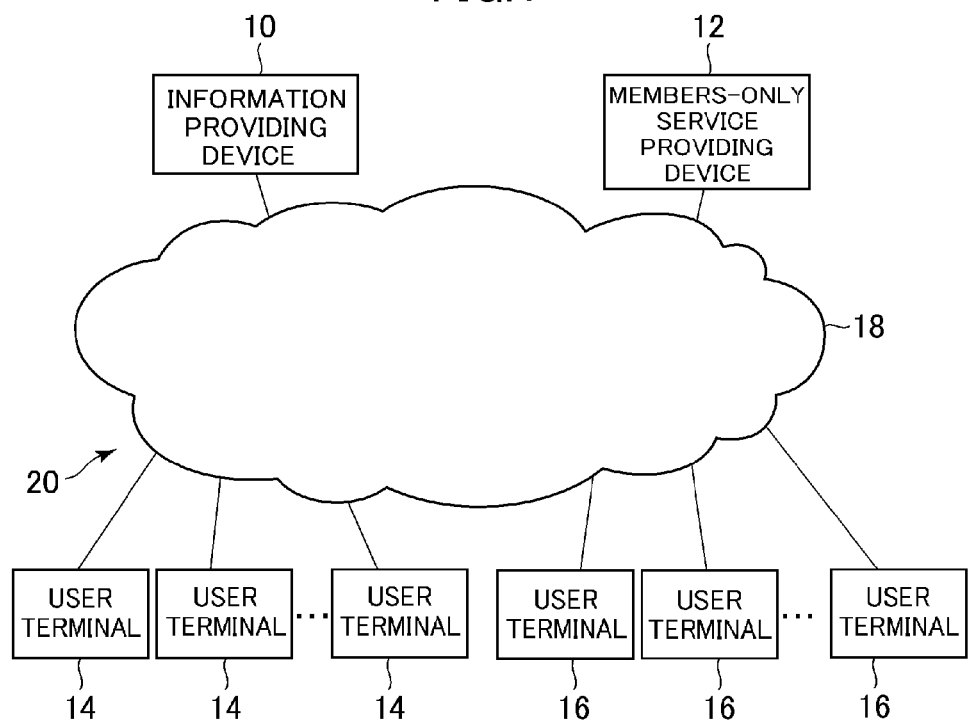
FIG. 1 is an overall schematic diagram illustrating an information providing system according to the present invention.

FIG. 1 is an overall schematic diagram illustrating an information providing system according to an embodiment of the present invention. The information providing system 20 includes an information providing device 10 and a user terminal 14 each connected to a computer communication network 18, such as the Internet. The computer communication network 18 is connected to a great number of user terminals 14. The information providing device 10 is constituted mainly of a computer, such as a known server computer. Each user terminal 14 is constituted mainly of a computer, such as a known personal computer, a home-use computer game system, a home server, a portable game device, a mobile phone, or a portable information terminal. Here, the user terminals 14 are installed with various game software programs to be executed according to a user's preference. The information providing device 10 has a function of presenting a recommended game software program to a user of each user terminal 14 (hereinafter referred to as "game user"). That is, the information providing device 10 has a function of sending recommended game software information to each user terminal 14.

The computer communication network 18 is connected to a members-only service providing device 12 and a great number of user terminals 16. The members-only service providing device is also constituted mainly of a computer, such as a known server computer. Each user terminal 16 is also constituted mainly of a computer, such as a known personal computer, a home-use computer game system, a home server, a portable game device, a mobile phone, or a portable information terminal. Here, the members-only service providing device 12 functions as an e-commerce website where game software is sold. That is, a user (hereinafter referred to as "service user") can purchase a desired game software program by accessing the members-only service providing device 12 from the user terminal 16 using an ID and a password. Further, the members-only service providing device 12 also functions to store an evaluation (review) of each game software program sent from each user terminal 16, and send the received evaluation (review) to each user terminal 16. In this way, each service user can know how each game software program is evaluated by other users, and use the evaluation in selecting a game software program to purchase.

Figure 2:
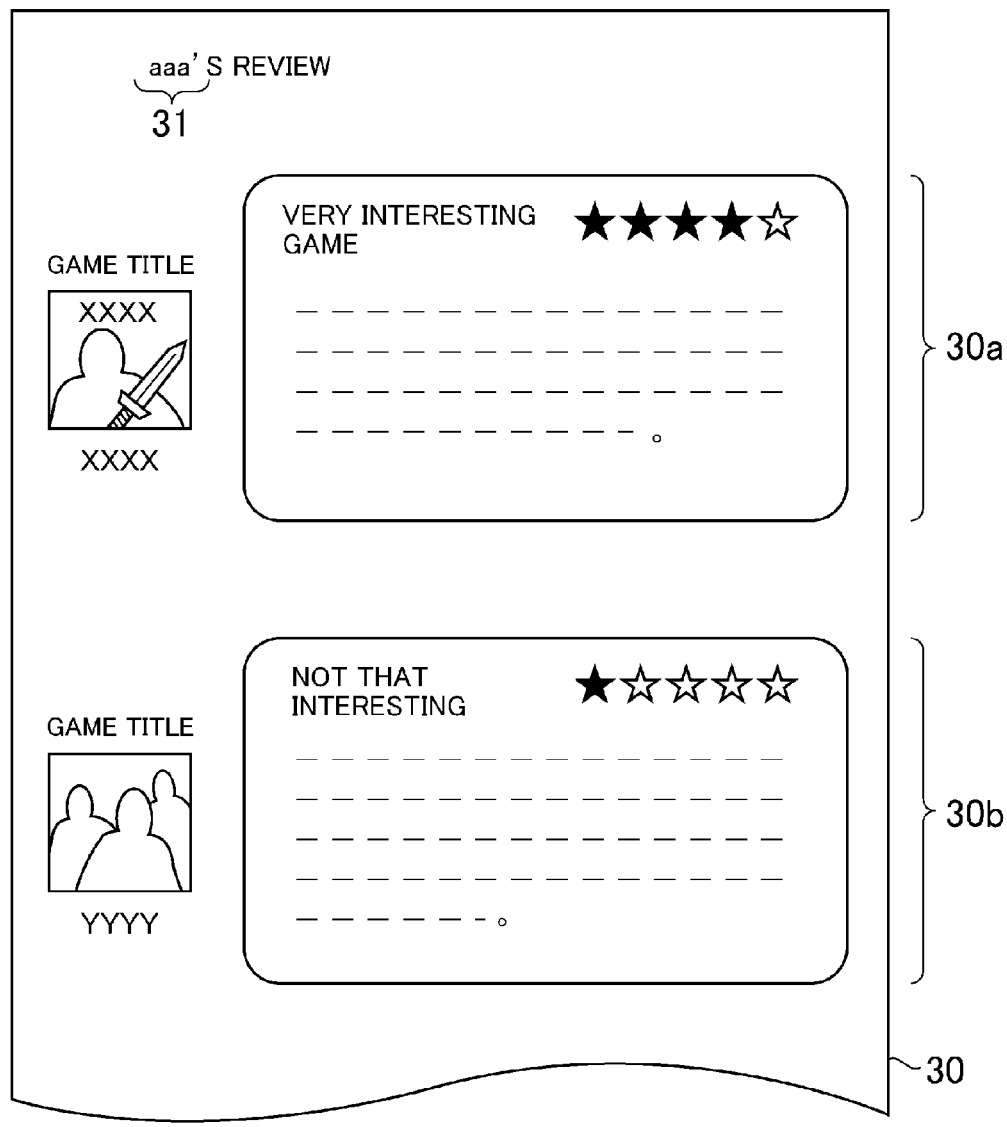
FIG. 2 is a diagram illustrating an example of an evaluation page.

FIG. 2 illustrates an example of an evaluation page sent from the members-only service providing device 12 to a user terminal 16. When the user terminal 16 sends data on a game title, an evaluation of the game title, and an evaluation value (numerical value of 1 to 5) of the game title to the members-only service providing device 12, the members-only service providing device 12 stores the received data in association with an ID of the user. The evaluation page 30 shown in FIG. 2 is generated based on the data thus stored. In particular, the evaluation page 30 includes an ID column 31 of the service user and a plurality of evaluation columns 30a and 30b. Each of evaluation columns 30a and 30b includes a game title, an evaluation, and an image according to an evaluation value (e.g. a star ranking image).

The information providing device 10 accesses the members-only service providing device 12 regularly or irregularly to receive an evaluation page 30 of each user. Subsequently, using a clustering technique, the information providing device 10 classifies the service users into a plurality of clusters based on content of the evaluation page 30. Clustering (cluster analysis) is one of the unsupervised data classification methods, which includes Ward's method and K-means. The information providing device 10 then sends a feature vector (reference) that represents each cluster to the user terminal 14.

The user terminals 14 each store execution history or install history of the game software programs, and calculate a feature vector of a game user based on the stored history information. Further, based on the feature vector of the game user and a representative feature vector of each cluster, the user terminal 14 determines a cluster corresponding to the game user. The user terminal 14 then displays information (recommended game software information) relating to the cluster corresponding to the game user.

Figure 3:
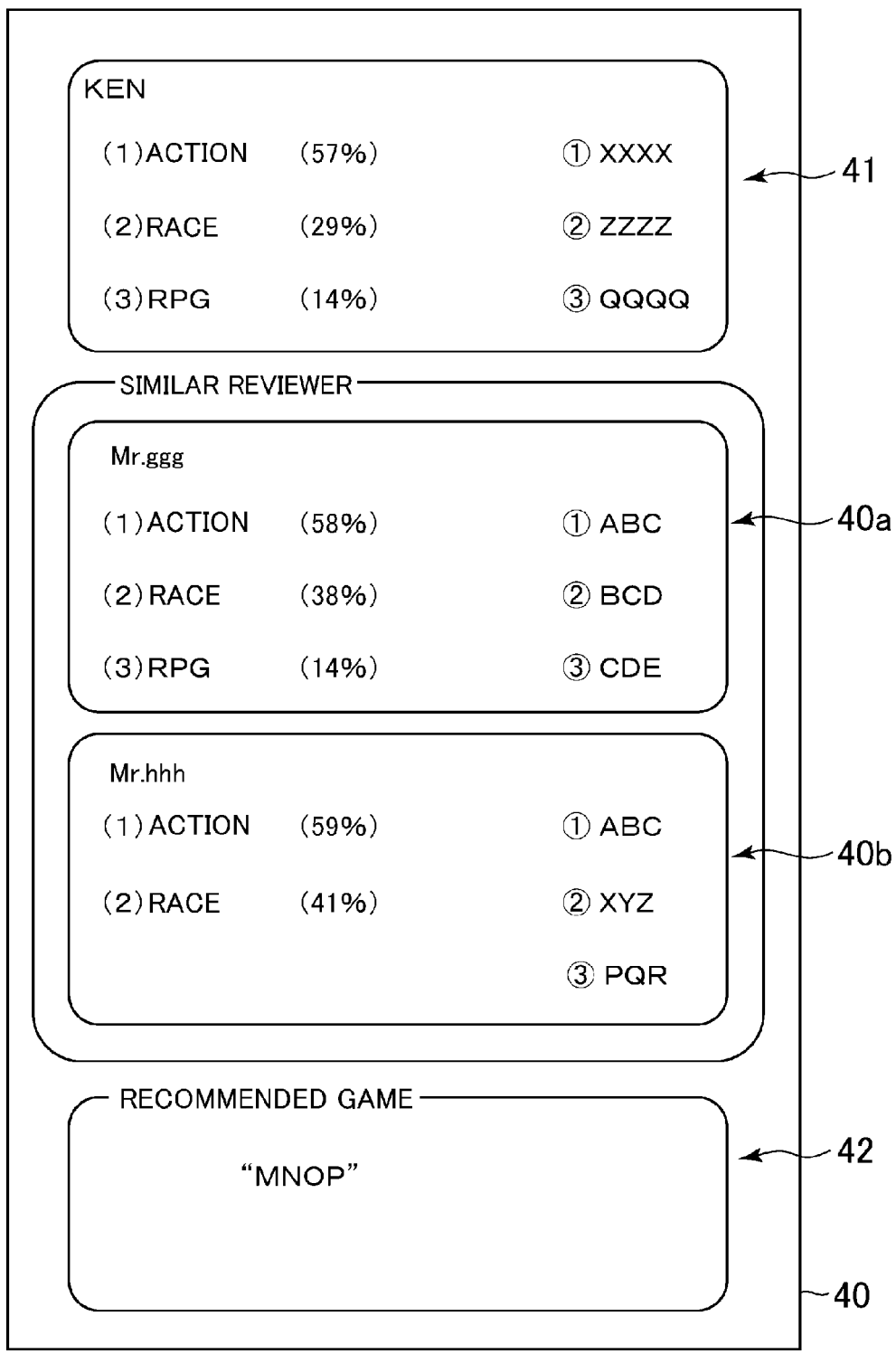
FIG. 3 is a diagram illustrating an example of recommended game software information.

FIG. 3 illustrates an example of recommended game software information displayed on the user terminal 14. As shown in FIG. 3, the recommended game software information 40 includes user information 41, a plurality of items of similar reviewer information 40a and 40b, and new release game software information 42. The user information 41 includes an ID of the game user, a genre of game software program played or installed by the game user, and a title of the game software program played or installed recently. The similar reviewer information items 40a and 40b each includes a genre of game software program that is reviewed by a service user who belongs to a cluster that is determined to correspond to the game user, and a title of the game software program that is recently reviewed by the service user. The new release game software information 42 includes titles of new game software programs.

Figure 4:
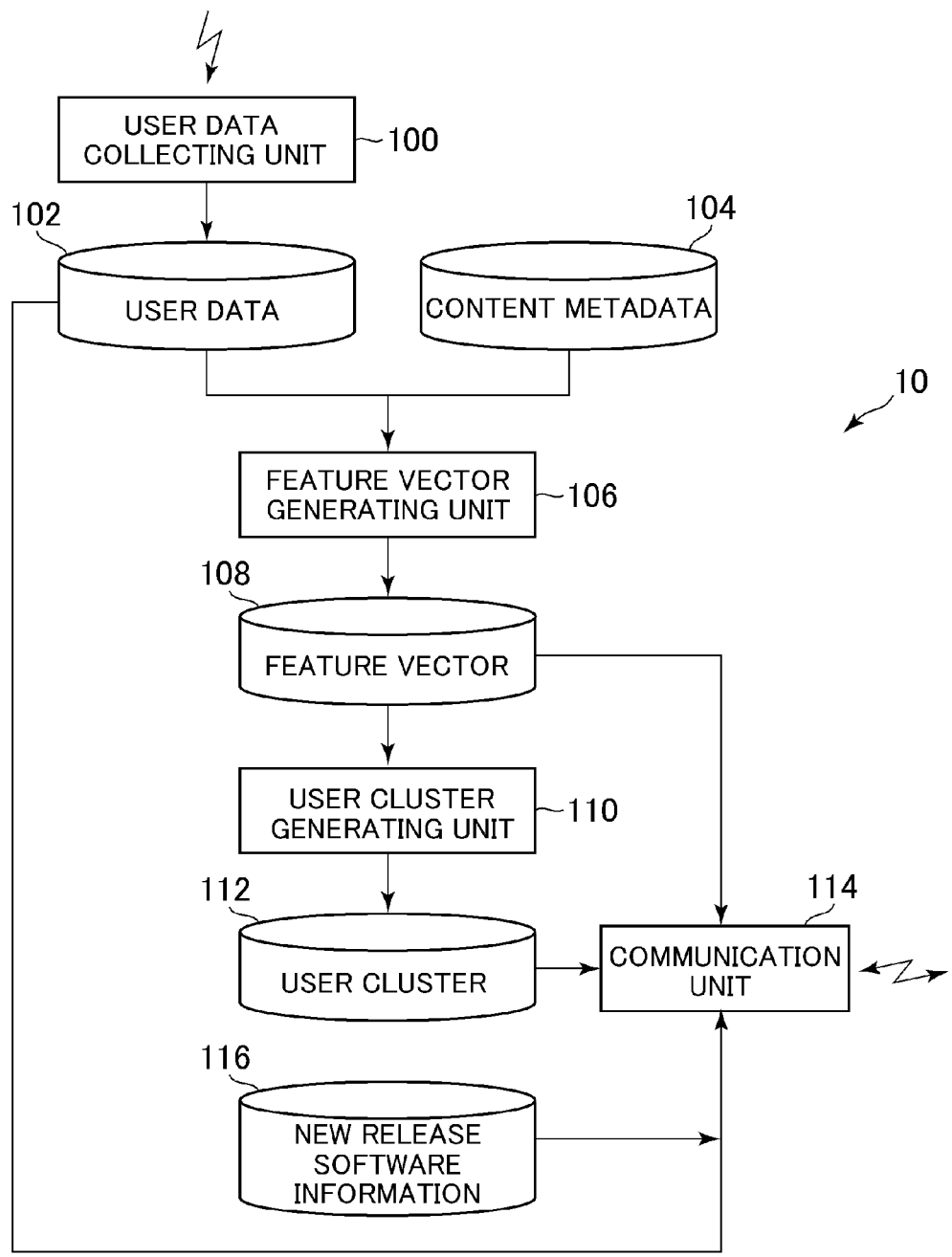
FIG. 4 is a functional block diagram illustrating the information providing device.
Figure 5:
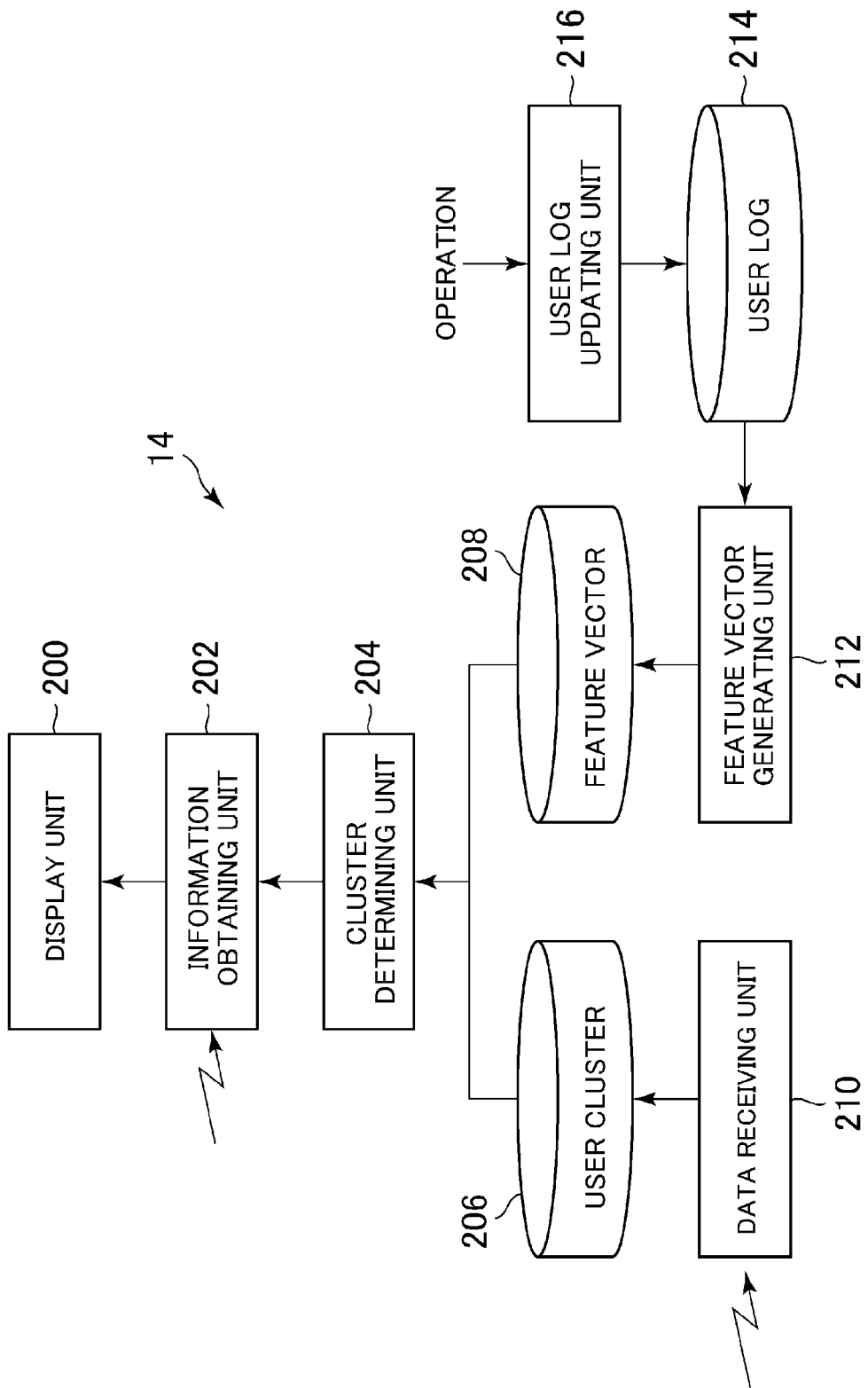
FIG. 5 is a functional block diagram illustrating a user terminal.

In the following, information processing executed in the information providing device 10 and the user terminal 14 will be described in detail. FIG. 4 is a functional block diagram of the information providing device 10, and FIG. 5 is a functional block diagram of the user terminal 14.

As shown in FIG. 4, the information providing device 10 functionally includes a user data collecting unit 100, a user data storing unit 102, a content metadata storing unit 104, a feature vector generating unit 106, a feature vector storing unit 108, a user cluster generating unit 110, a user cluster storing unit 112, a communication unit 114, and a new release software information storing unit 116. These elements are implemented by the information providing device 10, which is a computer, executing a program that is an embodiment of the present invention. The program may be installed from a computer readable information storage medium, such as a CD-ROM or a DVD-ROM, or downloaded from the computer communication network 18 to be installed.

The user data collecting unit 100 accesses the members-only service providing device 12 regularly or irregularly to receive an evaluation page 30 of each service user. For example, the user data collecting unit 100 may access the members-only service providing device 12 every month, or may access it in association with an increase in service users or in response to an evaluation that is uploaded. The user data collecting unit 100 obtains an ID of a service user from the ID column 31 of the received evaluation page 30, and obtains a character string of a game title from each of evaluation columns (30*a*, 30*b* . . . ). The obtained ID and character string are associated with each other and stored in the user data storing unit 102.

FIG. 6 illustrates an example of content stored in the user data storing unit 102. As shown in FIG. 6, an ID of a service user who has made an evaluation and a title of a game software program for which the service user has created the evaluation, are associated with each other and stored in the user data storing unit 102. The user data storing unit 102 may store only the title of the game software program (game software program having an evaluation value equal to or greater than a predetermined value) which has received positive evaluation from the service user.

As shown in FIG. 7, the content metadata storing unit 104 associates and stores a title of each game software program and a genre of the game software program. Information stored in the content metadata storing unit 104 may be manually input by an operator of the information providing device 10. Alternatively, information may be obtained by accessing, through the computer communication network 18, the members-only service providing device 12 or other computers to download and analyze an introduction of a game software program.

The feature vector generating unit 106 generates a feature vector of each service user based on content stored in the user data storing unit 102 and the content metadata storing unit 104. Specifically, the feature vector generating unit 106 reads out a game title associated with an ID of each service user from the user data storing unit 102, and specifies a genre of each title based on content stored in the content metadata storing unit 104. In this way, it is checked how many times the service user has created evaluations of game software programs of respective genres. Further, the feature vector generating unit 106 normalizes the total number of evaluation creation times to be 100. The feature vector generating unit 106 stores the value thus obtained into the feature vector storing unit 108 as a value of each element of the feature vector. FIG. 8 exemplarily illustrates content stored in the feature vector storing unit 108. As shown in FIG. 8, the feature vector storing unit 108 stores an ID of each service user in association with a proportion of each genre in the evaluations created by the service user. A multi-dimensional vector that uses, as an element, the proportion of each genre in the evaluations created by the service user is a feature vector of the service user.

The user cluster generating unit 110 classifies the service users into a plurality of clusters based on a feature vector of each service user stored in the feature vector storing unit 108, and stores the classification results in the user cluster storing unit 112. Classifying method may employ a known clustering algorithm, for example, Ward's method or K-means. FIG. 9 schematically illustrates content stored in the user cluster storing unit. As shown in FIG. 9, the user cluster storing unit stores an ID of each cluster, a representative feature vector of the cluster, and an ID of a service user who belongs to the cluster, in association with one another. The representative feature vector of a cluster is a feature vector that represents the cluster and is generated based on the feature vector of the service user who belongs to the cluster. The representative feature vector of a cluster includes, for example, a gravity vector of the feature vector of the service user who belongs to the cluster. In this regard, every time the user data collecting unit 100 collects user data, the feature vector generating unit 106 may update the user data storing unit 102 and the user cluster generating unit 110 may update the user cluster storing unit. In this way, it is possible to distribute information including any recent trends.

As shown in FIG. 10, the new release software information storing unit 116 stores an ID and title of a new game software program in association with a cluster ID. The cluster ID to be associated with an ID and title of the new game software program may be set up manually, or set up automatically based on a distance (e.g., Cosine distance or Euclidean distance) between a feature vector of the new game software program and a representative feature vector of each cluster.

The communication unit 114 sends an ID and representative feature vector of each cluster to the user terminal 14. The user terminal 14 selects a cluster ID based on the sent information, and returns the selected cluster ID to the information providing device 10. Upon receiving the returned cluster ID, the communication unit 114 then returns information relating to a cluster to be identified by the received cluster ID, i.e., information to be the basis of the recommended game software information. This information includes a game title stored in the new release software information storing unit 116 in association with the received cluster ID.

As shown in FIG. 5, the user terminal 14 functionally includes a display unit 200, an information obtaining unit 202, a cluster determining unit 204, a user cluster storing unit 206, a feature vector storing unit 208, a data receiving unit 210, a feature vector generating unit 212, a user log storing unit 214, and a user log updating unit 216. These elements are implemented by the user terminal 14, which is a computer, executing a program that is an embodiment of the present invention. The program may be installed from a computer readable information storage medium, such as a CD-ROM or a DVD-ROM, or downloaded from the computer communication network 18, to be installed.

The data receiving unit 210 receives an ID and representative feature vector of each cluster that is sent from the communication unit 114 of the information providing device 10. The user cluster storing unit 206 stores the received ID and representative feature vector in association with each other.

As shown in FIG. 11, the user log storing unit 214 stores log data including a date (or a date and time) when a game user executes a game software program on the user terminal 14, a title of the game software program, and a genre of the game software program. The user terminal 14 includes an input device, such as a gamepad, a keyboard, or a pointing device (e.g., mouse). According to a signal from the input device, the user terminal 14 stores log data in the user log storing unit 214. The user terminal 14 may download content stored in the content metadata storing unit 104 of the information providing device 10, and determines the genre of the game software program based on the content. Further, the user log storing unit 214 may sequentially store a game software program installed in the user terminal 14 and its genre.

The feature vector generating unit 212 generates a feature vector of a game user based on content stored in the user log storing unit 214. Specifically, the genres contained in each log data item stored in the user log storing unit 214 are compiled so as to calculate what genre of game software program has been executed in what ratio. Subsequently, the feature vector generating unit 212 derives, as a feature vector of the game user, a multi-dimensional vector with a ratio of each genre as an element. In this regard, the number of dimensions of a feature vector generated in the feature vector generating unit 212 is the same as the number of dimensions of a feature vector generated in the feature vector generating unit 106, and respective elements of each feature vector are also identical. The generated feature vector is stored in the feature vector storing unit 208.

The cluster determining unit 204 selects one of the clusters based on content stored in the user cluster storing unit 206 and the feature vector storing unit 208. Specifically, the cluster determining unit 204 calculates a distance between a representative feature vector of each cluster stored in the user cluster storing unit 206 and a feature vector of a game user stored in the feature vector storing unit 208 so as to select the nearest cluster. Subsequently, the cluster determining unit 204 sends a cluster ID of the selected cluster to the information obtaining unit 202.

The information obtaining unit 202 sends the cluster ID to the communication unit 114 of the information providing device 10. The communication unit 114 reads out, from the user cluster storing unit, IDs of service users who belong to a cluster specified by the received cluster ID. The communication unit 114 then reads out feature vectors of the service users from the feature vector storing unit 108. The communication unit 114 then reads out, from the user data storing unit 102, titles of a predetermined number or less of game software programs for which the service users have created recent evaluations. Further, the communication unit 114 reads out, from the new release software information storing unit 116, a game title associated with the received cluster ID. Subsequently, the communication unit 114 sends the feature vector, the game title of the game software program, for which each service user has created an evaluation, and the game title of the new game software program, each being read out in a manner explained above, to the user terminal 14.

The information obtaining unit 202 generates recommended game software information shown in FIG. 3 based on the received information mentioned above. In an example of FIG. 3, the information obtaining unit 202 calculates a distance between a feature vector of a game user stored in the feature vector storing unit 208 and a feature vector of each service user received by the information obtaining unit 202, and generates similar reviewer information 40a and 40b only with respect to a predetermined number of service users which are near in distance.

However, the information obtaining unit 202 may generate similar reviewer information with respect to all of the service users who belong to the selected cluster. In addition, the information obtaining unit 202 may generate similar reviewer information with respect to all of the service users selected on any other basis (including random basis). The recommended game software information thus generated is displayed on the display unit 200 including, for example, a flat panel display. In this way, a game user can know game software programs, which a service user similar to the game user is interested in, and use the information as a guide for selecting a game software program to buy next time.

According to this embodiment, it is not necessary to calculate a distance between a feature vector of a game user and feature vectors of all service users. As a result, calculating costs (cost of computational resources and time) can be reduced significantly. In addition, it is not necessary to send feature vectors of all service users collectively to the user terminal 14. As a result, it is possible to reduce an amount of data to be sent, and promote the protection of personal information of service users.

If there are a sufficient number of service users, it is possible to recommend game software programs with a high accuracy even though a number of game users is small. Further, since the new release software information storing unit 116 stores information on new software programs in association with each cluster and supplies the user terminal 14 with the information, it is possible to provide a game user with a recommendation of a new software program for which no evaluation has been created yet.

The present invention is not to be limited to the above described embodiment.

For example, while only one cluster corresponding to a game user is selected in the above description, a plurality of clusters may also be selected. In this case, the information obtaining unit 202 may obtain information on the selected plurality of clusters, and display the information on the unit 200.

The new release software information storing unit 116 may store not only titles of new game software programs, but also titles of existing game software programs. Further, the new release software information storing unit 116 may store information on product/service other than game software programs. In this way, a variety of information can be provided to game users.

The present invention is also applicable to other purposes than presenting game titles to game users, such as presenting TV programs to viewers or presenting products to users of e-commerce sites.

Further, an element of a feature vector of each service user to be used during clustering is not limited to a genre of a game software program for which an evaluation has been created, but may be a game software production company or a type of computer hardware capable of executing game software. The element may also be other information, such as age, gender, information on whether or not a keyword is included in an evaluation.

In the above, the cluster determining unit 204 of the user terminal 14 selects the cluster. However, the feature vector of the game user may be sent from the user terminal 14 to the information providing device 10 so that the information providing device 10 may select the cluster.

Further, in the above, the features of users or clusters are expressed in a vector format, however the features may of course be expressed in other formats, such as scalar form or matrix form.

The invention claimed is:

1. An information providing system, comprising:
a sever computer, including:
   a user data collecting unit configured to obtain user evaluations of a plurality of application programs;
   a first feature data generating unit configured to generate a feature data item for each of a plurality of users providing the user evaluations;
   a classifying unit configured to classify the plurality of users into a plurality of clusters based on the feature data item of each of the plurality of users;
   a reference feature data generating unit configured to generate a respective reference feature data item for each of the plurality of clusters; and a representative feature data sending unit configured to send a representative feature data item, which represents each of the plurality of clusters, to the client computer;

a client computer, including:

a representative feature data receiving unit configured to receive the representative feature data item;

a second feature data generating unit configured to generate a feature data item for a given user based on usage of another plurality of application programs by the given user;

a cluster selecting unit configured to select at least one of the plurality of clusters for the given user based on comparing the feature data item generated by the second feature data generating unit with the reference feature data items, and based on the representative feature data item received by the representative feature data receiving unit; and an information output unit configured to output information related to the selected cluster.

2. The information providing system according to claim 1, wherein the information output unit outputs information related to at least one of the plurality of users classified into the selected cluster.

3. The information providing system according to claim 1, further comprising:

an information storing unit configured to store given information in association with at least one of the clusters, wherein the information output unit outputs the given information stored in the information storing unit in association with the selected cluster.

4. The information providing system according to claim 1, wherein the first feature data obtaining unit comprises:

an information receiving unit configured to receive information related to each of the plurality of users through a communications network; and a feature data generating unit configured to generate the feature data item of each of the plurality of users based on the received information.

5. The information providing system according to claim 1, wherein the first feature data obtaining unit repeatedly obtains the feature data item of each of the plurality of users, wherein the classifying unit classifies the plurality of users into the plurality of clusters each time the feature data item of each of the plurality of users is obtained.

6. An information providing device, comprising:

a user data collecting unit configured to obtain user evaluations of a plurality of application programs;

a first feature data generating unit configured to generate a feature data item for each of a plurality of users providing the user evaluations;

a classifying unit configured to classify the plurality of users into a plurality of clusters based on the feature data item of each of the plurality of users;

a reference feature data generating unit configured to generate a respective reference feature data item for each of the plurality of clusters thereby producing a plurality of reference feature data items;

a representative feature data sending unit configured to send one or more of the plurality of reference feature data items to other computers;

a cluster specifying data receiving unit configured to receive respective cluster specifying data from the other computers, each of the respective cluster specifying data being produced by one of the other computer via: (i) a second feature data generating unit configured to generate a feature data item for a given user based on usage of another plurality of application programs by the given user, and (ii) selecting at least one of the plurality of clusters for the given user based on comparing the generated feature data item with the reference feature data items; and an information sending unit configured to send information related to the cluster specified by the cluster specifying data to the other computers.

7. A non-transitory computer readable storage medium having a program stored thereon, which when executed by a computer, causes the computer to:

obtain user evaluations of a plurality of application programs;

generate a feature data item for each of a plurality of users providing the user evaluations;

classify the plurality of users into a plurality of clusters based on the feature data item of each of the plurality of users;

generate a respective reference feature data item for each of the plurality of clusters;

send one or more of the reference feature data items to other computers;

receive respective cluster specifying data from the other computers, each of the respective cluster specifying data being produced by one of the other computers via: (i) generating a feature data item for a given user based on usage of another plurality of application programs by the given user, and (ii) selecting at least one of the plurality of clusters for the given user based on comparing the generated feature data item with the reference feature data items; and send information related to the cluster specified by the cluster specifying data to the other computers.

8. A computer having a program stored thereon, which when executed, causes the computer to:

obtain user evaluations of a plurality of application programs;

generate a feature data item for each of a plurality of users providing the user evaluations;

classify the plurality of users into a plurality of clusters based on the feature data item of each of the plurality of users;

generate a respective reference feature data item for each of the plurality of clusters;

send one or more of the reference feature data items to other computers;

receive respective cluster specifying data from the other computers, each of the respective cluster specifying data being produced by one of the other computers via: (i) generating a feature data item for a given user based on usage of another plurality of application programs by the given user, and (ii) selecting at least one of the plurality of clusters for the given user based on comparing the generated feature data item with the reference feature data items; and send information related to the cluster specified by the cluster specifying data to the other computers.

9. A client computer, comprising:

a representative feature data receiving unit configured to receive a plurality of reference feature data items from a server computer, the reference feature data items representing each of a plurality of clusters, wherein the server computer includes: (i) a user data collecting unit configured to obtain user evaluations of a plurality of application programs; (ii) a first feature data generating unit configured to generate a feature data item for each of a plurality of users providing the user evaluations; (iii) a classifying unit configured to classify the plurality of users into a plurality of clusters based on the feature data item of each of the plurality of users; and (iv) a reference feature data generating unit configured to generate a respective reference feature data item for each of the plurality of clusters;

a second feature data generating unit configured to generate a feature data item for a given user based on usage of another plurality of application programs by the given user;

a cluster selecting unit configured to select at least one of the plurality of clusters for the given user based on comparing the feature data item generated by the second feature data generating unit with the reference feature data items; and an information output unit configured to output information related to the selected cluster.

10. A method, comprising:

receiving a plurality of reference feature data items from a server computer, the reference feature data items representing each of a plurality of clusters, wherein the server computer includes: (i) a user data collecting unit configured to obtain user evaluations of a plurality of application programs; (ii) a first feature data generating unit configured to generate a feature data item for each of a plurality of users providing the user evaluations; (iii) a classifying unit configured to classify the plurality of users into a plurality of clusters based on the feature data item of each of the plurality of users; and (iv) a reference feature data generating unit configured to generate a respective reference feature data item for each of the plurality of clusters;

generating a feature data item for a given user based on usage of another plurality of application programs by the given user;

selecting at least one of the plurality of clusters for the given user based on comparing the feature data item that was generated for the given user with the plurality of reference feature data items received; and outputting information related to the selected cluster.

11. A non-transitory computer readable storage medium having a program stored thereon, which when executed by a computer causes the computer to perform the method of:

receiving a plurality of reference feature data items from a server computer, the reference feature data items representing each of a plurality of clusters, wherein the server computer includes: (i) a user data collecting unit configured to obtain user evaluations of a plurality of application programs; (ii) a first feature data generating unit configured to generate a feature data item for each of a plurality of users providing the user evaluations; (iii) a classifying unit configured to classify the plurality of users into a plurality of clusters based on the feature data item of each of the plurality of users; and (iv) a reference feature data generating unit configured to generate a respective reference feature data item for each of the plurality of clusters;

generating a feature data item for a given user based on usage of another plurality of application programs by the given user;

selecting at least one of the plurality of clusters for the given user based on comparing the feature data item that was generated for the given user with the plurality of reference feature data items received; and outputting information related to the selected cluster.

\* \* \* \* \*